US006282417B1

(12) United States Patent
Ward

(10) Patent No.: US 6,282,417 B1
(45) Date of Patent: Aug. 28, 2001

(54) COMMUNICATION RADIO METHOD AND APPARATUS

(76) Inventor: David K. Ward, 28808 SE. Mud Mountain Rd., Enumclaw, WA (US) 98022

(*) Notice: Subject to any disclaimer, the term of this patent is extended or adjusted under 35 U.S.C. 154(b) by 0 days.

(21) Appl. No.: 09/306,931

(22) Filed: May 7, 1999

Related U.S. Application Data

(60) Provisional application No. 60/084,771, filed on May 8, 1998.

(51) Int. Cl.[7] ........ H04Q 7/20

(52) U.S. Cl. ........ 455/431; 455/456; 701/200

(58) Field of Search ........ 455/422, 423, 455/424, 425, 431, 450, 455, 456, 457, 432, 186.1, 185.1, 437, 434, 436, 62, 66; 701/14, 15, 16, 200, 211, 201, 207, 214, 219; 73/178 R; 244/189, 192; 340/905, 928, 988–995; 342/357.05, 394

(56) References Cited

U.S. PATENT DOCUMENTS 3,925,750 * 12/1975 Gilbert et al. ........ 340/961
3,936,828 * 2/1976 Muesse et al. ........ 342/394
4,651,282 * 3/1987 Robinson et al. ........ 455/158.2
5,222,249 * 6/1993 Carney ........ 455/452
5,289,526 * 2/1994 Chymyck et al. ........ 455/424
5,294,075 * 3/1994 Vertatschitsch et al. ........ 244/75 R
5,509,051 * 4/1996 Barnett et al. ........ 455/443
5,648,770 * 7/1997 Ross ........ 340/994
5,940,761 * 8/1999 Tiedemann, Jr. et al. ........ 455/437
5,941,931 * 8/1999 Ricks ........ 701/207
5,946,611 * 8/1999 Dennison et al. ........ 455/404
6,014,564 * 1/2000 Donis et al. ........ 455/436
6,028,537 * 2/2000 Suman et al. ........ 340/988
6,112,141 * 8/2000 Briffe et al. ........ 701/14
6,163,681 * 12/2000 Wright et al. ........ 455/66
6,163,753 * 12/2000 Beckmann et al. ........ 701/213

* cited by examiner

*Primary Examiner*—Nay Maung
*Assistant Examiner*—Jean A Gelin
(74) *Attorney, Agent, or Firm*—Delbert J. Barnard

(57) ABSTRACT

A radio frequency selecting system operable by a pilot within an aircraft (10). The aircraft (10) travels through successive zones of space (12–28) each having a separate, dedicated frequency (f1–f9) that is used for radio communication between an aircraft (10) in the zone and the controller that provides flight instructions to the pilot while the aircraft (10) is in that zone. The radio includes a display (42) of successive radio frequencies for successive zones, including the last frequency used in the last zone (LF), the current frequency in use in the current zone (CF), and the next frequency expected to be used in the next zone (NF). All of the displayed frequencies are derived from the vehicle present position and its relationship to the successive zones of space through which the vehicle will travel and their dedicated frequencies. A touch operated frequency selector (TOFS) is provided. It includes a cursor and a cursor control (44–46) for moving the cursor to select any of the displayed frequencies. The TOFS further includes a SELECT control (48) operable by touch to move the cursored frequency to the new CF position in the display and tune the radio to the new CF.

20 Claims, 6 Drawing Sheets

COMMUNICATION RADIO METHOD AND APPARATUS

RELATED APPLICATIONS

This application claims priority based on provisional application Serial No. 60/084,771, filed May 8, 1998, and entitled "Communication Radio."

TECHNICAL FIELD

The present invention relates to radio communication between a person in a vehicle and another person remote from the vehicle. More particularly, it relates to improvements in radio frequency determination, presentation and selection within the vehicle.

GLOSSARY OF TERMS

An understanding of the following terms and acronyms will be helpful to an understanding of the present invention. Most of the definitions which follow are from the Airman's Information Manual (AIM), sometimes referred to as the Aeronautical Information Manual. AIM is designed to provide airman with basic flight information Air Traffic Control (ATC) procedures for use in the National Airspace System (NAS) of the United States. AIM is available from the U.S. Government Printing Office, Ser. No. 9750-074-00000-1. The source of a definition that does not come from AIM is identified immediately following the definition, starting with the definition of ATC.

ATC—AIR TRAFFIC CONTROL

Air-Traffic Controllers, aided by radar and other electronic navigation devices, direct incoming and outgoing aircraft from airport control towers and control centers located some distance from the airfield. The controllers also direct all aircraft movements on the ground, guiding pilots as they taxi their planes between the loading apron and runway. Communication between the controllers and the pilots is by radio. (From the definition of "airport," in the New Encyclopedia Britannica, $15^{th}$ Edition, published 1994.)

ATC sector—AIR TRAFFIC CONTROL SECTOR

An airspace area of defined horizontal and vertical dimensions for which a controller or group of controllers has air traffic control responsibility, normally within an air route traffic control center or an approach control facility. Sectors are established based on predominant traffic flows, altitude strata, and controller workload. Pilot-communications during operations within a sector are normally maintained on discrete frequencies assigned to the sector.

ATIS—AUTOMATIC TERMINAL INFORMATION SERVICE

The continuous broadcast of recorded noncontrol information in selected terminal areas. Its purpose is to improve controller effectiveness and to relieve frequency congestion by automating the repetitive transmission of essential but routine information; e.g., "Los Angeles information Alfa. One three zero zero Coordinated Universal Time. Weather, measured ceiling two thousand overcast, visibility three, haze, smoke, temperature seven one, dew point five seven, wind two five zero at five, altimeter two niner niner six. I-L-S Runway Two Five Left approach in use, Runway Two Five Right closed, advise you have Alfa."

AUTOTUNE—

This term is used herein to mean switching from the current communication frequency to the next communication frequency automatically, i.e. without prompting from ATC and with only a minimal crew action or no crew action at all and without radio control manipulations. It instead utilizes a variation of installed CPU. As the vehicle transits the different ATC sectors or regional blocks, and the dedicated frequencies there assigned, once the vehicle needs a programmed parameter, the system will automatically change or tune frequencies to the next sectors assigned or dedicated frequency. The program parameters may be a distance or time from the sector boundary.

CADC—CENTRAL AIR DATA COMPUTER

A device for measuring air pressure for the purpose of determining airspeed and altitude. (This definition is common knowledge to pilots).

CLNC—CLEARANCE DELIVERY FREQUENCY

The discrete frequency used to transmit by voice an initial air traffic clearance. An air traffic clearance is an authorization by air traffic control, for the purpose of preventing collision between known aircraft, for an aircraft to proceed under specified traffic conditions within controlled airspace. The pilot-in-command of an aircraft may not deviate from the provisions of a visual flight rules (VFR) or instrument flight rules (IFR) air traffic clearance unless an amended clearance has been obtained. Additionally, the pilot may request a different clearance from that which has been issued by air traffic control (ATC) if information available to the pilot makes another course of action more practicable or if aircraft equipment limitations or company procedures forbid compliance with the clearance issued. Pilots may also request clarification or amendment, as appropriate, any time a clearance is not fully understood, or considered unacceptable because of safety of flight. Controllers should, in such instances and to the extent of operational practicality and safety, honor the pilot's request.

CPDLC—CONTROLLER/PILOT DATA LINK COMMUNICATION

One of the newest aviation communication concepts currently under development. A data link application that provides a means of communication between ATC controller and pilot using data link for some ATC communications. It is ATC controller to Pilot e-mail if you will, used to decrease the amount of voice traffic on the radios used to relay messages back and forth, especially those of the routine variety. The controller will relay an electronic data message to the aircrew instructing them to, for example, change radio frequencies. This will be read on a screen in the aircraft by the pilots. They will then manually change radio frequencies and contact the next ATC sector controller via voice communication. (Definition from industry technical publications of various sources).

CTR—AIR TRAFFIC CONTROL CENTER (also know as ARTCC) (AIR ROUTE TRAFFIC CONTROL CENTER)

A facility established to provide air traffic control service to aircraft operating on IFR flight plans within controlled airspace and principally during the en route phase of flight. When equipment capabilities and controller workload permit, certain advisory/assistance services may be provided to VFR aircraft. CTR is also known as ARTCC (Air Route Traffic Control Center).

CURSOR—

This is any device for directing attention to one of the frequencies that appear in the frequency display. For example, it can be a movable arrow, or a background light, a lighted outline surrounding a frequency line or some other highlighting device.

CURSOR CONTROL—

A device or devices operable for moving the cursor to change the identified frequency. Examples are a set of "up" and "down" buttons, or a tilt button, for moving the cursor in steps in either the "up" or "down" direction.

DEP—DEPARTURE CONTROL

A function of an approach control facility providing air traffic control service for departing IFR and, under certain conditions, VFR aircraft.

DME—DISTANCE MEASURING EQUIPMENT

Equipment (airborne and ground) used to measure, in nautical miles, the slant range distance of an aircraft from the DME navigational aid.

FMCS—FLIGHT MANAGEMENT SYSTEMS

A computer system that uses a large data base to allow routes to be preprogrammed and fed into the system by means of a data loader. The system is constantly updated with respect to position accuracy by reference to conventional navigation aids. The sophisticated program and its associated data base insures that the most appropriate aids are automatically selected during the information update cycle.

GLONASS—GLOBAL NAVIGATIONAL SATELLITE SYSTEM.

The Russian Global Navigation Satellite System (GLONASS) is based on a constellation of active satellites which continuously transmit coded signals in two frequency bands, which can be received by users anywhere on the Earth's surface to identify their position and velocity in real time based on ranging measurements. The system is a counterpart to the United States Global Positioning System (GPS) and both systems share the same principles in the data transmission and positioning methods.

GPS—GLOBAL POSITIONING SYSTEM

A space-base radio positioning, navigation, and time-transfer system being developed by Department of Defense. When fully deployed, the system is intended to provide highly accurate position and velocity information, and precise time, on a continuous global basis, to an unlimited number of properly equipped users. The system will be unaffected by weather, and will provide a worldwide common grid reference system. The GPS concept is predicated upon accurate and continuous knowledge of the spatial position of each satellite in the system with respect to time and distance from a transmitting satellite to the user. The GPS receiver automatically selects appropriate signals from the satellites in view and translates these into a three-dimensional position, velocity, and time. Predictable system accuracy for civil users is projected to be 100 meters horizontally. Performance standards and certification criteria have not yet been established.

GND—GROUND CONTROL.

A controller responsible for the movement of aircraft in the movement area. The movement area consists of the runways, taxiways, and other areas of an airport/heliport which are utilized for taxiing/hover taxiing, air taxiing, takeoff, and landing of aircraft, exclusive of loading ramps and parking areas. At those airports/heliports with a tower, specific approval for entry onto the movement area must be obtained from ATC.

IFR—INSTRUMENT FLIGHT RULES

Rules governing the procedures for conducting instrument flight. Also a term used by pilots and controllers to indicate type of flight plan.

IRS—INERTIAL NAVIGATION REFERENCE SYSTEM

An RNAV system which is a form of self-contained navigation.

NAV—NAVIGATIONAL AID

Any visual or electronic device airborne or on the surface which provides point-to-point guidance information or position data to aircraft in flight.

NZL—NEXT ZONE LOGIC

This is a coined term that is generic to any program, logic or information that will identify to the CPU the next zone into which the vehicle will travel. Most frequently, this is some sort of travel plan logic (TPL).

RNAV—AREA NAVIGATION

A method of navigation that permits aircraft operation on any desired course within the coverage of station-referenced navigation signals or within the limits of a self-contained system capability.

Random area navigation routes are direct routes, based on area navigation capability, between waypoints defined in terms of latitude/longitude coordinates, degree/distance fixes, or offsets from published or established routes/airways at a specified distance and direction. The major types of equipment are:

1. VORTAC referenced or Course Line Computer (CLC) systems, which account for the greatest number of RNAV units in use. To function, the CLC must be within the service range of a VORTAC.

2. OMEGA/VLF, although two separate systems, can be considered as one operationally. A long-range navigation system based upon Very Low Frequency radio signals transmitted from a total of seventeen stations worldwide.

3. Inertial (INS) systems, which are totally self-contained and require no information from external references. They provide aircraft position and navigation information in response to signals resulting from inertial effects on components within the system.

4. MLS Area Navigation (MLS/RNAV), which provides area navigation with reference to an MLS ground facility.

5. LORAN-C is a long-range radio navigation system that uses ground waves transmitted at low frequency to provide user position information at ranges of up to 600 to 1,200 nautical miles at both en route and approach altitudes. The usable signal coverage areas are determined by the signal-to-noise ratio, the envelope-to-cycle difference, and the geometric relationship between the positions of the user and the transmitting stations.

SELECT CONTROL—

This is a coined term for a button or other device operable by "touch", and the necessary hardware and/or software, for moving a cursored frequency to the "C" line in the frequency display, for shifting the surrounding frequencies in position on the display, and for tuning the radio to the new CF frequency. It includes a device that is also programmed to cause the display of a manually tunned frequency and tune the radio to that frequency, when touched without first moving the cursor to select a new CF frequency.

TACAN—TACTICAL AIR NAVIGATION

An ultra-high frequency electronic rho-theta air navigation aid which provides suitably equipped aircraft a continuous indication of bearing and distance to the TACAN station.

TPL—TRAVEL PLAN LOGIC

This is a coined term that is intended to be generic to a programmed flight plan or any other data or system that can be used to inform the CPU as to the succession of zones or sectors through which the vehicle will travel.

TWR—TOWER

A terminal facility that uses air/ground communications, visual signaling, and other devices to provide ATC services to aircraft operating in the vicinity of an airport or on the movement area. Authorizes aircraft to land or takeoff at the airport controlled by the tower or to transit the Class D airspace area regardless of flight plan or weather conditions (IFR or VFR). A tower may also provide approach control services (radar or nonradar).

VFR—VISUAL FLIGHT RULES

Rules that govern the procedures for conducting flight under visual conditions. The term "VFR" is also used in the United States to indicate weather conditions that are equal to or greater than minimum VFR requirements. In addition, it is used by pilots and controllers to indicate type of flight plan.

VOR—VERY-HIGH FREQUENCY OMNIRANGE

A ground-based electronic navigation aid transmitting very high frequency navigation signals, 360 degrees in azimuth, oriented from magnetic north. Used as the basis for navigation in the National Airspace System. The VOR periodically identifies itself by Morse Code and may have an additional voice identification feature. Voice features may be used by ATC or FSS for transmitting instructions/ information to pilots.

VORTAC—VOR/TACAN

A navigation aid providing VOR azimuth, TACAN azimuth, and TACAN distance measuring equipment (DME) at one site.

Other terms may be used herein which are not included in this glossary. Most of these terms will be defined where used or by their use or will be understood by persons skilled in the art.

BACKGROUND OF THE INVENTION

Airspace through which aircraft travel is divided into three-dimensional regional zones or sectors known as ATC sectors. The boundaries of the ATC sectors are determined laterally by latitudinal and longitudinal coordinates. The boundaries are determined vertically by the designation of specific altitudes as the lower limit (or base) and upper limit (or top) of a particular ATC sector. Further, each ATC sector is typically assigned a set of permanent communication frequencies in both the very-high frequency (VHF) range and the ultra-high frequency (UHF) range. ATC controllers use these frequencies to maintain voice contact with aircraft crews. In this manner, the ATC controllers maintain control over the aircraft with respect to ATC directions and clearances.

As an aircraft passes from one ATC sector to the next, an ATC controller will direct a frequency change from the current sector frequency to the frequency of the upcoming ATC sector via a verbal exchange with the pilot. In other words, the ATC controller for the sector that the aircraft has been in informs the pilot that he is about to enter into the next ATC sector and he (the pilot) is to tune his radio to the frequency for the next ATC sector. With conventional aircraft radios, in order to do this, the pilot must direct the majority of his attention to the radio control head and through a series of manual radio control manipulations, switch radio frequencies and initiate verbal contact with the new sector's controller. This series of events is necessary for every frequency change. Each time, it diverts the pilots attention from other more important duties, two of the most important being: 1) flying the aircraft and 2) looking outside of the aircraft for conflicting aircraft traffic. Being able to do neither of these tasks efficiently during the course of every frequency change is a significant detriment to the safest possible operation of the aircraft. This prior-art methodology, partially as a result of the limitations listed below, continually results in or contributes to the following: (1) mis-selection of frequencies, (2) exceptional amounts of pilot heads down time (i.e. time spent concentrating on items inside of the cockpit, not outside), continual frequency confirmation callbacks to ATC controllers, and pilot and ATC controller fatigue. These limitations of voice commanded frequency changes include, but are not limited to: (1) blocked frequency transmissions, (2) poor reception quality, (3) poor transmission quality, (4) poor enunciation, (5) distracting background noise, and (6) clipped or cut off radio transmissions. This methodology is also totally dependent upon voice transmission and reception, with no other sensory aid whatsoever. Further, the notice to change frequencies directed by the ATC controller is usually entirely unexpected and random in nature as the pilots have no defined way of knowing exactly where the ATC sector (regional block) boundries are located. These frequency changes take place, on average, nearly nine times during every flight hour on jet aircraft. Each change takes nearly ten seconds and eight radio control manipulations to complete, from the time the aircraft leaves parking on the ground until its return to parking after the flight segment. Therefore, it is plain to see this problem is a continual, repetitive, and distracting one that affects flight deck workload, continuity, and flight safety.

An additional related frequency change problem occurs each time an aircraft begins the standard sequence of events to leave the originating airport. It occurs to some extent with those aircraft operating under visual flight rules (VFR). It occurs to a great extent with aircraft operating on an instrument flight rules (IFR) flight plan. The crew must in nearly every instance contact, in order, air terminal information service (ATIS), clearance delivery (CLNC.), ground control (GND.), tower control (TWR.), and in initial flight just after departure, departure control (DEP.). The prior-art methodology necessary for this series of events requires the crew to reference on board publications to identify every one of the above discreet frequencies, and then manually tune in each of the frequencies as they are needed during ground operation. Again, this a continual, repetitive, and distracting problem affecting flight deck workload, continuity, and ultimately flight safety.

A principal object of the present invention is to provide a touch operated control and, alternatively, an automatic control, for tuning a communication radio to each new frequency, to eliminate the above discussed problems experienced when using the prior-art methodology.

The invention has particular use where the vehicle is an aircraft. It is believed, however, that the invention is not limited to aircraft use but has a more general application.

BRIEF SUMMARY OF THE INVENTION

The invention includes providing a radio frequency selecting system that is operable by an operator within a vehicle that will be traveling through successive zones of space, each having a different radio frequency. The system includes a radio aboard the vehicle that includes a display of the current frequency in use. A CPU is connected to receive and is programmed to use information from a navigational system (NAV), for detecting the present position of the vehicle, zone frequency logic (ZFL), associating each zone with the radio frequency for that zone, and next zone logic (NZL), e.g. travel plan logic (TPL) established a travel plan for the vehicle by zones. The CPU uses the information for associating the current position of the vehicle with the zone it is in, with the radio frequency for that zone, with the next zone into which the vehicle is expected to travel, and with the radio frequency for the next zone. The touch operated frequency selector (TOFS) is connected to the CPU and the radio, for changing radio frequency. The TOFS is so adapted, and the CPU is so programmed that substantially upon the vehicle entering a new zone, the operator can by touch select and display a new CF tune the radio to the new CF.

The present invention includes, as an option providing the radio with a manual frequency selector (MFS) and a second display associated with the MFS, showing the frequencies that has been selected by use of the MFS.

The present invention also includes providing a radio frequency selecting system in which the radio aboard the vehicle includes a display of successive radio frequencies for successive zones, including the last frequency used in the last zone (LF), the current frequency in use in the current zone (CF), and the next frequency expected to be used in the next zone (NF). In this system, the TOFS is so adapted, and the CPU is so programmed that substantially upon the vehicle entering (or approaching) a new zone, the operator can be touch change the displayed frequencies to a new LF and new CF and a new NF, all as a result of touch tuning the radio to the new CF.

In a preferred embodiment, the TOFS includes a cursor and a cursor control for moving the cursor to any of the displayed frequencies. The TOFS further includes a SELECT control operable by touch to move the cursored frequency to the CF position in the display and tune the radio to the new CF.

The radio may include both the TOFS and a manual frequency selector (MFS) and a second display associated with the MFS, showing the frequency that has been selected by use of the MFS.

The invention further includes a method of tuning a communication radio in a vehicle that in use travels through successive zones of space, each having a dedicated communication radio frequency to be used while the vehicle is in that zone. A navigational system (NAV) is used for determining the position of the vehicle. A zone frequency logic (ZFL) is provided. This logic associates each zone with the dedicated communication radio frequency for that zone. A program CPU is provided. The method includes the steps of tuning the communication radio to the dedicated communication frequency for a new zone substantially upon vehicle movement into the new zone. The tuning step includes use of the CPU, the NAV position information and the ZFL.

In one embodiment of the invention, the tuning further uses autotune logic. This logic causes an automatic tuning of the radio to the next frequency for the next zone in response to the aircraft reaching a predetermined distance or time away from the next ATC sector boundary. Another embodiment uses a cursor and a touch operated cursor control for identifying on a display the dedicated frequency for the next zone. Preferably, a display is provided that displays successive dedicated frequencies for successive zones. The cursor control is used for moving the cursor to identify on the display the dedicated frequency for the next zone. A touch operated SELECT control is provided. The CPU is programmed to in response to a touch on the SELECT control, tune the communication radio to the cursored frequency. In preferred form, the display includes at least a "C" line for displaying a current frequency CF, and at least one "N" line for displaying the next frequency NF. In sequence, the operator uses the cursor control to identify the frequency at the "N" line of the display as being the frequency for the next zone. Then, the SELECT control is touched to move the cursored NF frequency up to the "C" line of the display. It does this substantially simultaneously with tuning the communication radio to the new CF frequency.

These and other advantages, objects, and features will become apparent from the following best mode description, the accompanying drawings, and the claims, which are all incorporated herein as part of the disclosure of the invention.

BRIEF DESCRIPTION OF THE DRAWINGS

In the several views of the drawing, like reference numerals and letters are used to designate like parts, and.

DETAILED DESCRIPTION OF THE INVENTION

The invention will first be described with respect to radio communication between a pilot in an aircraft and an air controller on the ground. This is because the invention was developed for the purpose of simplifying the selection and presentation of radio communication frequencies by a pilot in an aircraft. It is believed, however, that the invention has a more general use. It can be used with other vehicles, as well.

Figure 1:
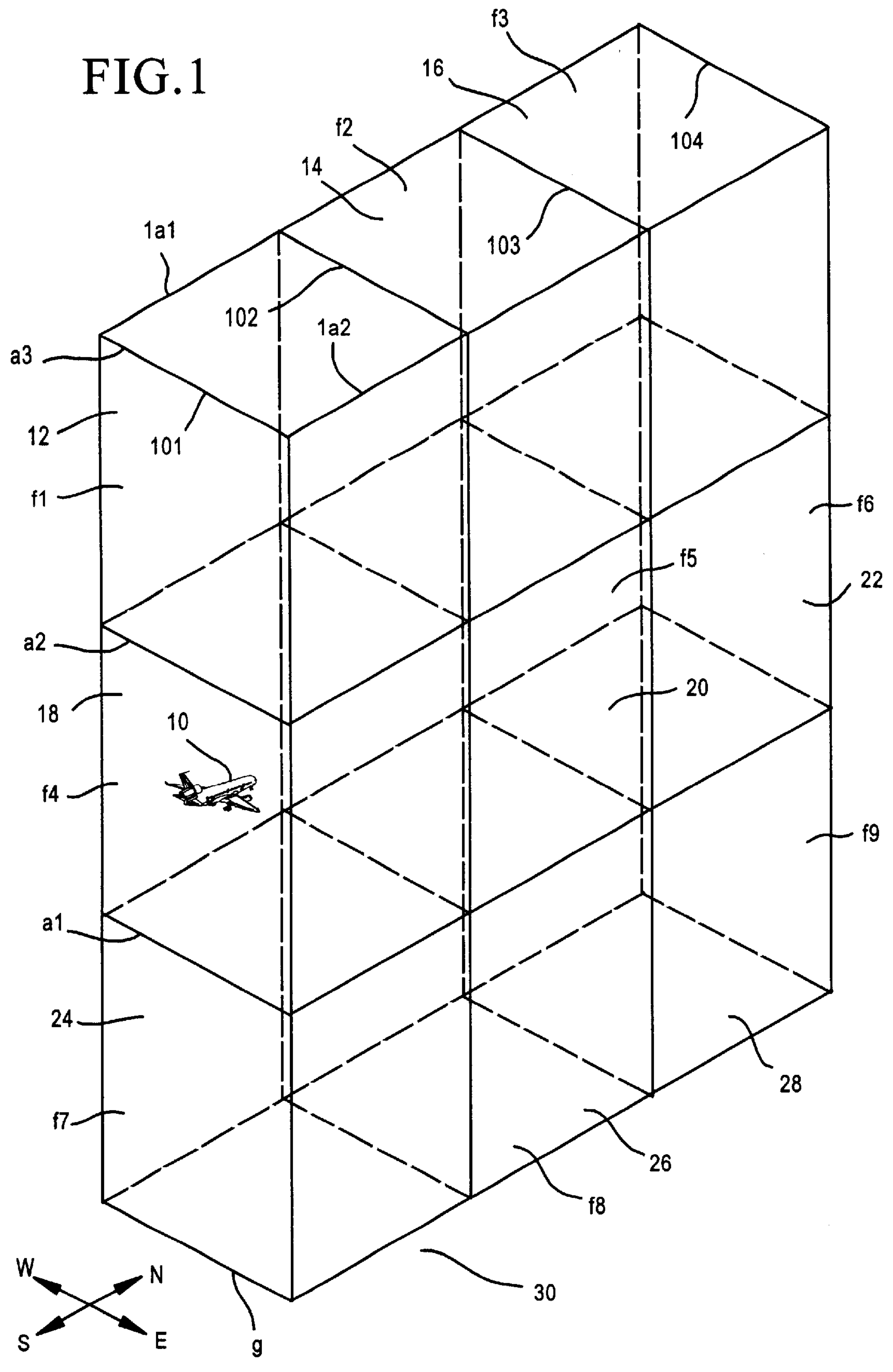
FIG. 1 is a diagram of airspace that has been divided into a plurality of ATC sectors, said diagram showing an airplane within one sector moving towards another sector.

FIG. 1 shows a plurality of adjoining ATC sectors 12, 14, 16, 18, 20, 22, 24, 26, 28 and an aircraft 10 within ATC sector 18. The sectors are shown to be formed by horizontal and vertical boundary lines. In reality, the vertical boundary lines are radial lines that extend outwardly from the center of the earth 30 and upwardly from the surface of the earth 30. The horizontal boundary lines are circular segments, viz. segments of circles that surround the earth. Despite the inaccuracy of the shape of the sectors, the diagram shows how the air space is divided. Lines lo1, lo2, lo3, lo4 are at particular longitudes; they extend east and west. Lines la1, la2 are at particular latitudes; they extend north and south. Line g is at ground. Lines a1, a2, a3 are at particular altitudes.

The example ATC sectors 12, 14, 16, 18, 20, 22, 24, 26, 28 have dedicated frequencies f1, f2, f3, f4, f5, f6, f7, f8, f9, respectively. The aircraft 10 is shown to be within ATC sector 18 to which has been assigned a frequency f4. According to standard operating procedures and rules, while in ATC sector 18, the aircraft 10 must use frequency f4 for its radio communication with the air controller that is directing the flight of aircraft 10. When the aircraft 10 nears the boundary between sectors 18, 20, the air controller will tell the pilot to retune his communications radio to a frequency f5 that is the dedicated frequency for zone 20.

Figure 2:
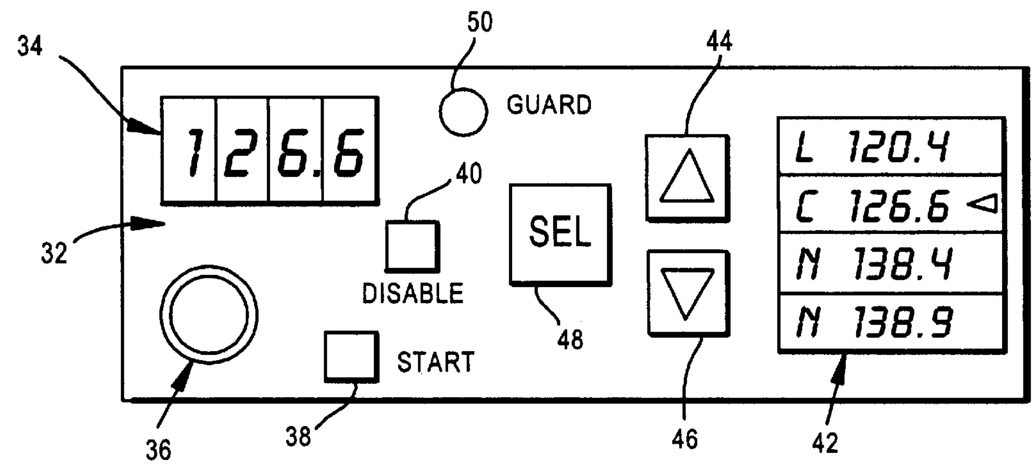
FIG. 2 is a front elevational view of a radio control head that exemplifies one aspect of the invention.
Figure 3:
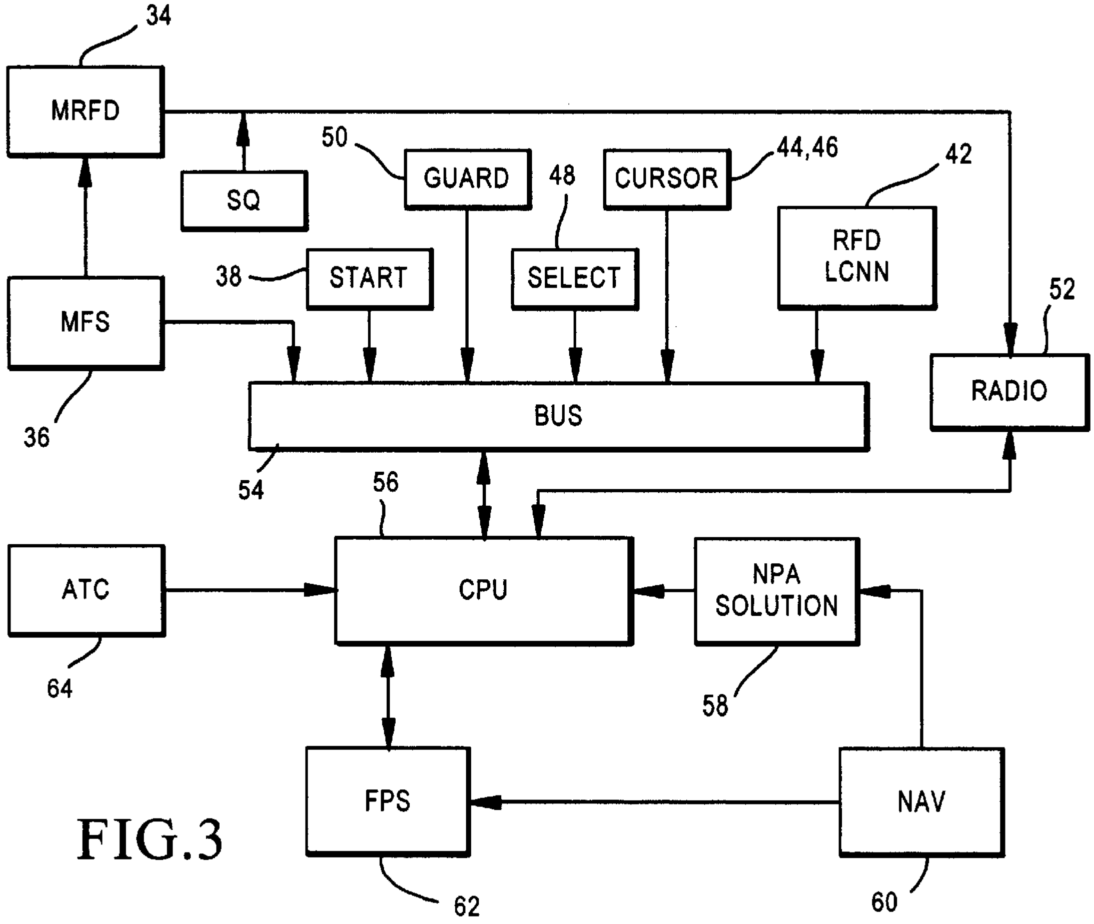
FIG. 3 is a block diagram of an embodiment of the invention that includes the radio control head shown by FIG. 2.
Figure 4:
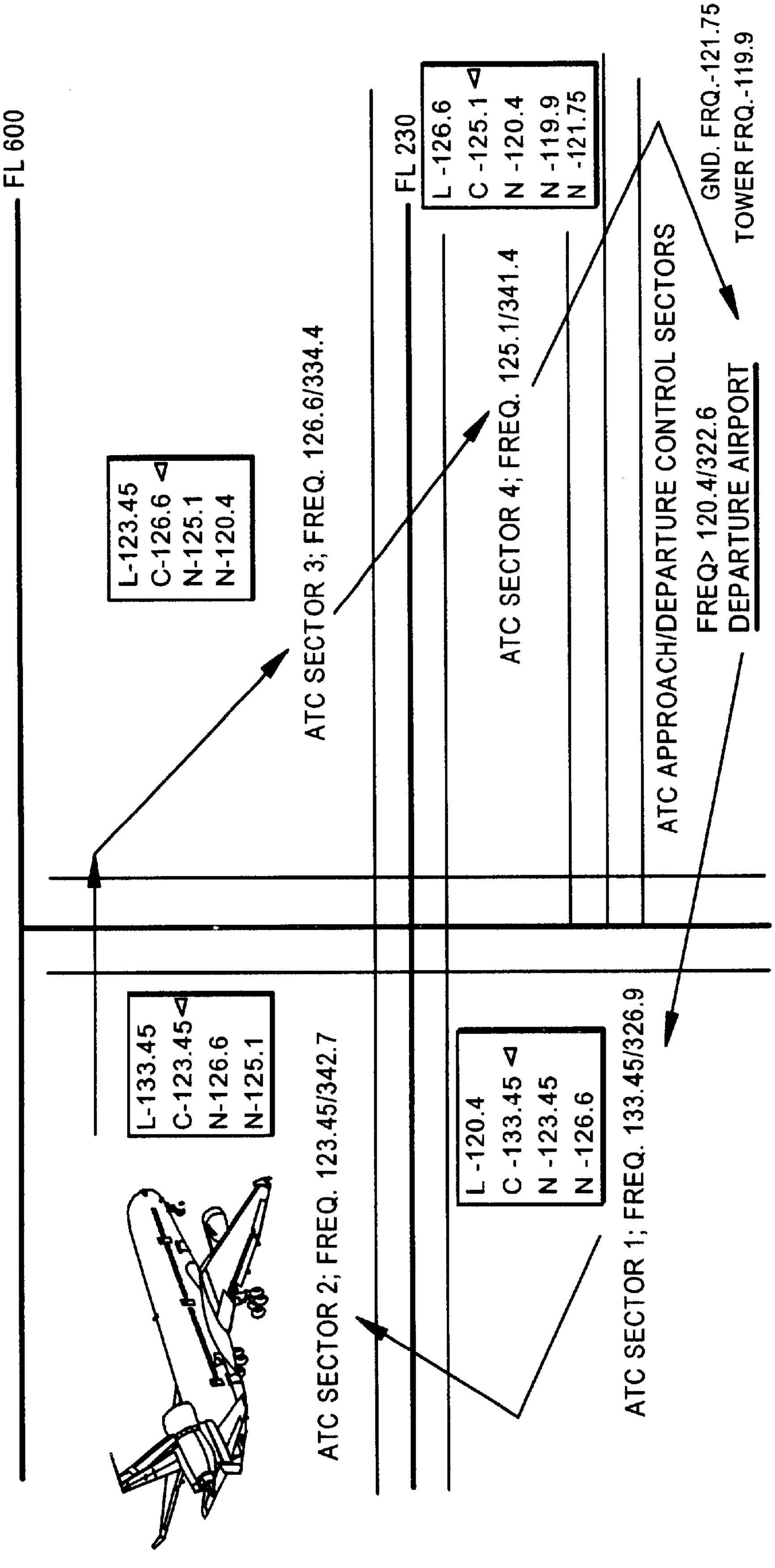
FIG. 4 is a diagram of a typical flight progression, showing the aircraft leaving and returning to the same airport, and showing it moving through five sectors in its journey.

FIGS. 2 and 3 show a radio control head 32 that is a part of an embodiment of the invention. Radio control head 32 includes a manual frequency select control 36 (e.g. a dial), a manual radio frequency display window 34, a start button 38 and a SQUELCH disable control 40. These elements 34, 36, 38, 40 are standard elements in most aircraft radios in use today. In the system of the present invention, they are used as a manual backup if needed. Radio control heads 32 of radios incorporating the invention also include a frequency progress display 42, a cursor control 44, 46, a SELECT control 48 and a guard control 50. The FIG. 2 embodiment has four lines of display in the display 42. Other embodiments may include more or less display lines. Cursor controls 44, 46 function to move a cursor to a selected frequency. The SELECT control (SEL) button causes the cursored frequency to move to the "CF" or "C" line in display 42 and further causes the other frequencies to move up or down in position on the display 42, depending on which cursor switch 44, 46 is depressed. If the cursor-switches 44, 46 are not used, a push on the SEL button will cause the manually selected (by use of control 36) frequency to move into the "C" position in the display 42. As will hereinafter be explained in more detail, pressing the START button causes automatic selection of a progressive frequency display for use during and in preparation for departure from an airport. This function is only active and available when the aircraft 10 is on the ground. Pressing the GUARD button causes emergency frequency 121.5 to appear at the "CF" or "C" line of the frequency display 42.

The radio unit used in the system of the invention may be any suitable type of radio operating on any suitable frequency range. In FIG. 3, the radio 52 is shown as a single unit, e.g. a transceiver. However, the radio 52 could just as well be two units, e.g. a transmitter and a receiver. A BUS 54 connects the radio control head components 34, 36, 38, 40, 42, 44, 46, 48, 50 to a CPU 56. The CPU 56 is connected to the radio 52. The radio 52 is also connected to the manual frequency control portion of the system.

Figure 6:
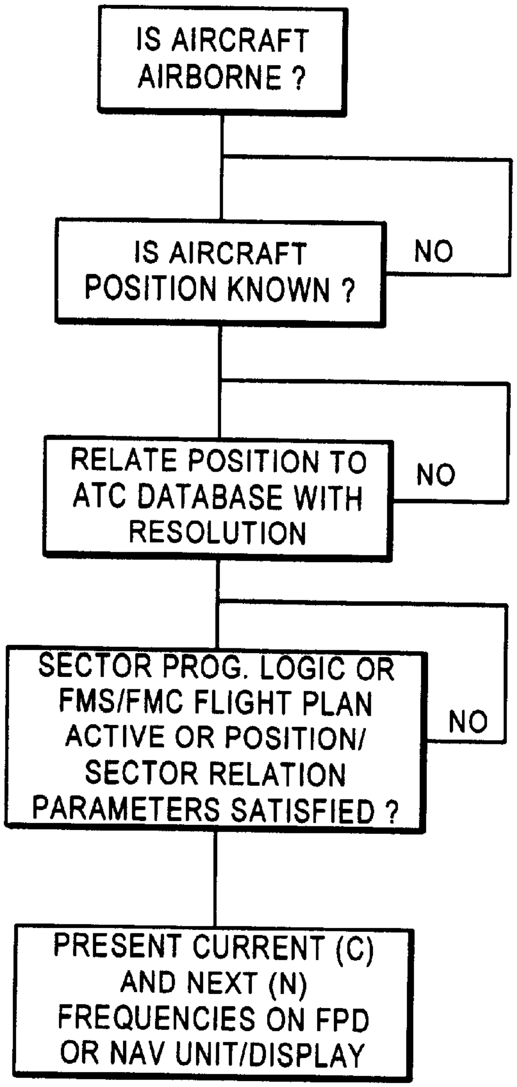
FIG. 6 is a flow diagram for presentation of frequencies while the aircraft is airborne.

The frequency determination method and CPU programming are dependent upon the particular embodiment of the invention. In an embodiment that employs a navigational system with the capability to navigate with the assistance of a programmed route of travel (e.g. a FMCS equipped vehicle), the system includes programmed route information available to present expected frequencies based on the planned route of the aircraft, the successive ATC sectors along the route, and their dedicated communication frequencies. In one embodiment not utilizing a programmed route of travel, the presentation of frequencies can be based on vehicle logic which predicts the vehicles probable transit through the ATC sectors, utilizing parameters respecting position, ground track, distance and/or time from boundaries and, if applicable, altitude or level, rate of climb/descent or rise/fall, and trend information (FIG. 6). In a simpler embodiment, the CPU may determine appropriate frequency or frequencies based only upon present position or some other single parameter, or pairs, or groups of parameters, present in the CPU program or database.

In each embodiment, the frequency data is displayed by a component of the specific embodiment. In the illustrated embodiment, it is displayed by the display region 42 of the radio head 32. In other embodiments, the frequency data is displayed by a display that is a part of that system. For example, the equipment used in today's NAV systems, such as FMCS, GPSS, IRS, and RNAV include displays of their own. These systems include line displays that can be adapted (programmed) for scrolling and selecting displayed frequencies in much the same manner as the radio head display 42 that has been described. Herein the term "display" means either a radio head display or some other display that functions like the radio head display 42. The expression "a radio aboard the vehicle including the display of successive radio frequencies for successive zones", includes such a display that is apart of a radio head, and also includes a display that is a part of a NAV system or a flight management system that is employed with the radio, in the manner described.

In the FIG. 2 embodiment, the CPU 56 is programmed to receive and use navigational position and altitude information to provide what is herein referred to as a NPA solution 58. The NPA solution 58 is a singular or blended position solution that is derived from typically installed aircraft navigational equipment or systems, herein termed NAV equipment 60. The NAV equipment 60 may comprise satellite dependent positioning system(s), typically GPS or GLONASS; an inertial reference system(s), e.g. IRS; VOR; DME; RNAV; CADC (typically for altitude determination only); and a FMCS. The NAV provides the navigational position data termed the NPA solution 58. The CPU 56 is programmed to use this data.

The CPU 56 is connected to receive route information from a flight plan system 62 and sector frequency information from an ATC database 64. The CPU 56 is programmed to use the information from sources 58, 62, 64 for determining the present position appropriate frequency, the next probable appropriate frequency, or perhaps a series of expected next appropriate frequencies. The CPU 56 is programmed to cause the frequency information to be displayed by the radio head display 42. The last frequency LF that was used in the last ATC sector is caused by the CPU to be displayed on the "L" line of the display 42. The current frequency CF in use in the current ATC sector is displayed on the "C" line. The next frequency NF that will be used in the next ATC sector is displayed on the first "N" line. The next frequency NF that follows it will be displayed on the second "N" line. Once a sequence of frequencies is in the system, the cursor controls 44, 46 and the select control 48 can be used to change the displayed frequencies. For example, the cursor switch 46 may be touched to move the cursor down to the frequency 138.4 disclosed at the first "N" line. After this is done, the SELECT button 48 can be pressed to move the cursored frequency up to the "C" line. At the same time, the former "L" frequency moves off the display 42. The former "C" frequency moves to the "L" position. The second "N" frequency moves to the first "N" position. Another next frequency NF that was not previously displayed moves into the second "N" position. "L, C and N" are frequency naming icons that may take on other names or labels such as "C" meaning the same as "active" and "N" meaning the same as "standby" or "STBY" or other similar examples. The former "L" frequency that was moved off the display 42 is retained in a memory that may have the capability to store a number (as many as desired) of frequencies in the sequence, available for recall at a later time by operation of the cursor and select controls 44, 46, 48. The memory may also store a number (as many as desired) additional next frequencies NF, making them available for recall at a later time by use of the cursor and select controls 44, 46, 48.

The cursor controls 44, 46 move the cursor (e.g. an arrow 43) to one of the displayed frequencies. For example, a simple touch of cursor control 46 will move the cursor 43 downwardly to the 138.4 frequency. In response to a push on the SELECT button 48, the cursored frequency 138.4 will move upwardly to the "C" line. The old CF frequency 126.6 will move upwardly to the "L" line. The old "L" frequency 120.4 will move off of the display but will remain in memory. The former second "N" frequency 138.9 will move upwardly to the first "N" frequency line. A new next frequency will move from memory onto the display at the second "N" line. The touch of the SELECT button 48 also tunes the radio to the new CF frequency 138.4 at the "C" line in the display 42. Thus, by a first quick and easy touch of one of the cursor controls 44, 46, a new current frequency CF is identified. By a second quick and easy touch of the SELECT button 48, the cursored frequency is displayed at the "C" line of the display 42 and the radio is tuned to this frequency.

The preferred embodiment shown by FIGS. 2 and 3 includes, as an option, the manual frequency selection system that is standard on existing radios. It is there to be used in the event of a frequency option ambiguity, a receipt of a particular ATC direction, or an equipment failure. Thus, for example, if a vehicle crew is requested to contact a frequency that is not on the display 42, or cannot be quickly scrolled to place it on the display 42, the operator need only set that particular frequency with the manual frequency select control 36. This is done by turning the knob or dial 36 in one direction or the other to increase or decrease the value of the frequency displayed on the manual frequency display window 34. Once set, the operator pushes the SELECT control button 48. In response to this touch action on the button 48, the manual selected frequency is tuned to the radio and becomes displayed at the "C" line on the display 42. Thus, at any time, if the operator reaches over and touches the SELECT button 48, without first using the cursor control 44, 46 to identify a new frequency, the frequency that has been manually selected and is displayed at the display 34 will become the selected frequency. The radio will be tuned to this frequency and this frequency will appear at the "C" line on the display 42.

In all of the different applications and embodiments of the invention the display and control head functions and controls would vary in physical design, construction, and to some extent means of operation because of the wide variety of aircraft types and their installed radio systems typically installed in different aircraft or vehicles. The application of the present invention to today's NAV systems such as GPSS, IRS, RNAV, and their presentation and interface with FMCS further expands the scope of the invention's application scenarios. The present invention would be applied in both newly manufactured aircraft and in the retrofit of radios in existing aircraft, adapting the invention to the presently existing radio types in those retrofitted aircraft, or by replacing those radio systems with a new radio system which includes the present invention. The present invention applied in concert with these control heads and displays (in their different forms) would however, display the frequency options in a line, row or column oriented electronic, LCD (liquid crystal display), AMLCD (active matrix liquid crystal display), or other state of the art display. The present invention would also be designed in such a way that it would function in concert with the next generation communication radios currently emerging into the market that are compliant with or can be upgraded to the new VDR (VHF data radio)standard and other similar standards for the radio type in question (UHF, HF, etc.).

The present invention would also be capable of operating in concert with controller/pilot datalink communications (CPDLC), allowing the pilots to either select the newly directed frequency manually utilizing the present invention; or in it's autotune embodiment, the newly directed frequency would be automatically tuned after satisfying programmed parameters for accomplished of that task.

Herein, the travel plan logic (TPL) consists of a program or logic installed in the CPU. The programming or logic determines vehicle route or expected path through successive sectors based on programming installed for the particular embodiment of the invention. The TPL may in one embodiment reference an actual programmed route of travel from a NAV system or FMCS, that program route being expected vehicle route travel through successive sectors. In a simpler embodiment, a vehicle without a NAV system with programming capability or FMCS, the TPL might reference the resolution of travel parameters respecting position in space, ground track, distance and/or time from sector boundaries and, if applicable, altitude and levels of trends thereof. In a still simpler embodiment, the TPL might be defined as determination or presentation of appropriate frequency based only on reference to vehicle present position and its relationship to or resolution of particular ATC sector the vehicle is currently in.

The system could also in one embodiment tune the frequencies automatically (autotune), that is switch from the old to the new frequency without prompting from ATC and without manual crew action or radio control manipulations, with a variation of CPU 45. As the vehicle transited the different geographic regions or regional blocks and their dedicated frequencies, having satisfied the programmed parameters for frequency change, the system would use technology (as does common autotune technology in use today in navigation radio applications) installed in this embodiment to automatically change frequencies. This might essentially relegate the radio control head to back-up status. In a variation of that embodiment the radio control head as we know it might be eliminated.

Figure 8:
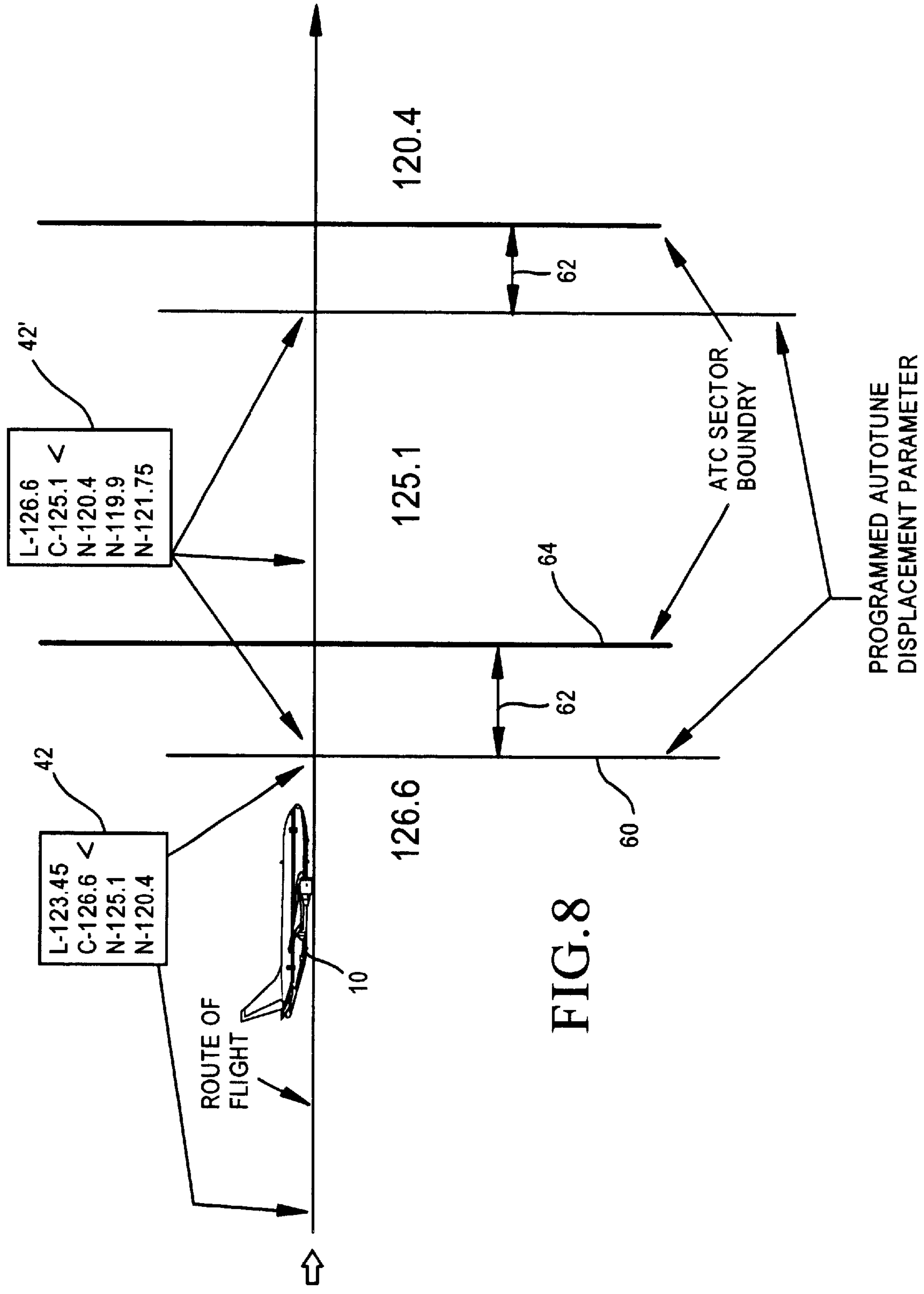
FIG. 8 is a diagram of an autotune embodiment, such diagram showing the aircraft 10 approaching a location at which the autotune equipment begins functioning to automatically change the frequency of the communication radio to the frequency of the next sector.

FIG. 8 diagrams the autotune embodiment. Referring to FIG. 8, the aircraft 10 is shown approaching a station 60 that is a distance or time 62 from the next ATC sector boundary 64. In this embodiment, the CPU is programmed to in response to the aircraft 10 reaching the station 60, automatically change or tune the communication radio frequency to the dedicated frequency that has been assigned to the next zone. In the illustrated example, in its illustrated position the aircraft 10 is tuned to frequency 126.6. When the aircraft 10 reaches or passes station 60, and is substantially at boundary 64, the programmed CPU automatically changes the communication frequency to frequency 125.1 for the next zone or sector. The FIG. 8 embodiment is shown to include frequency displays. The present position current frequency CF 126.6 is shown at the "C" line in display 42. Display 42' shows the shift in frequencies that has occurred in response to the aircraft 10 being a predetermined distance from the sector boundary 64. It also shows a third new NF frequency added to the display 42' at a third "N" line.

Figure 5:
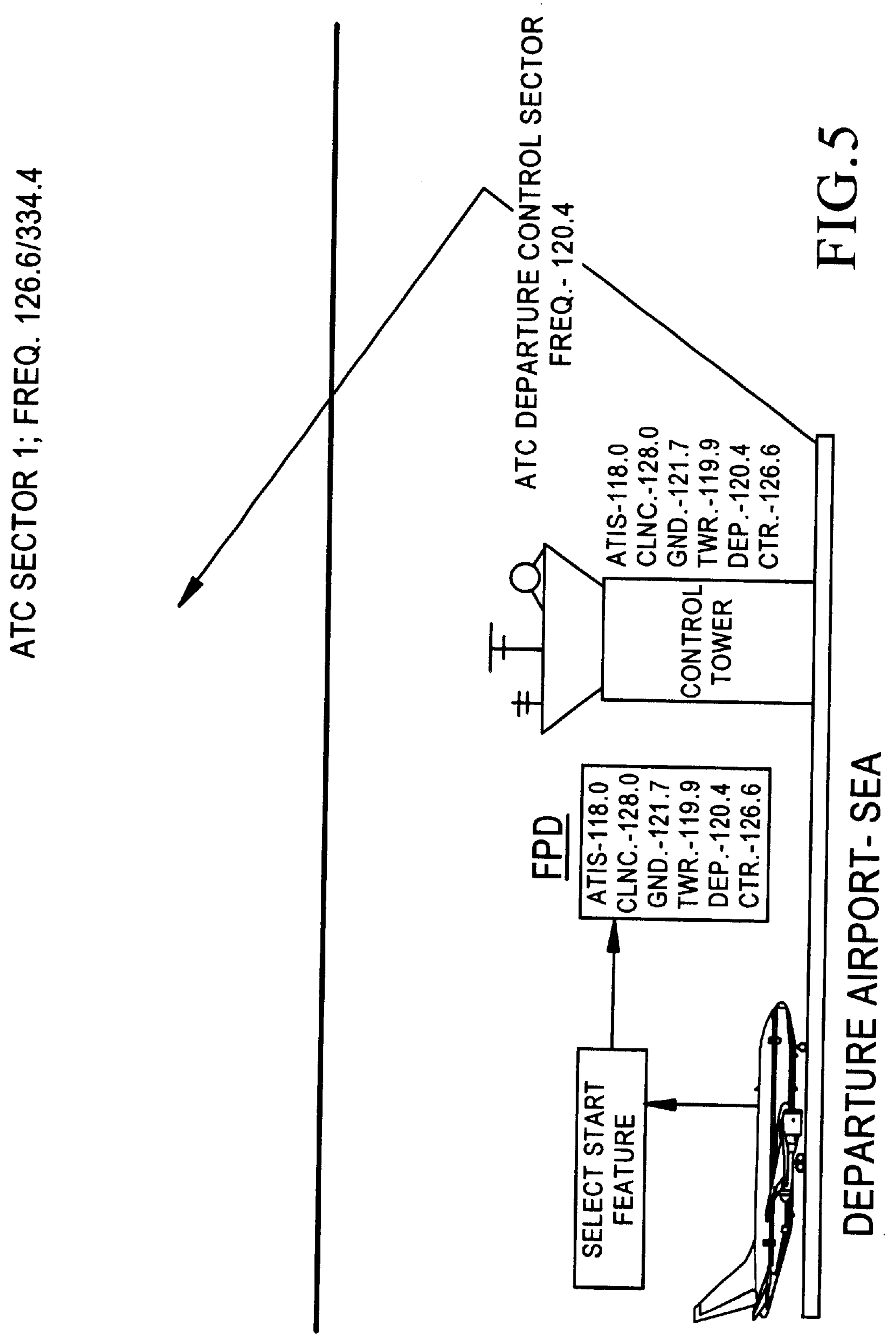
FIG. 5 is a diagram of a six line frequency progress display (FPD) as it would present itself while the aircraft is on the ground and the inventions START feature has been selected.
Figure 7:
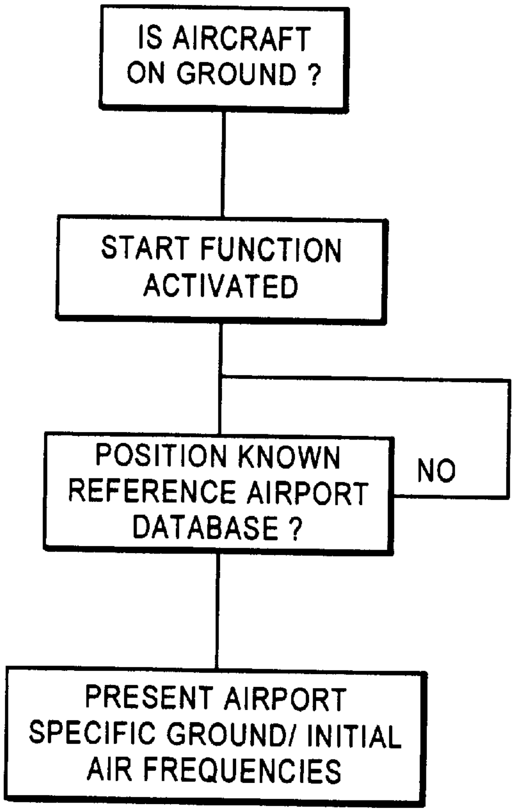
FIG. 7 is a flow diagram for presentation of frequencies when utilizing the START function of the invention.

The START feature shown in the embodiment in FIGS. 2 and 3, and detailed in FIGS. 5 and 7, enables the vehicle crew to select for display on PFD 42, all frequencies normally used on the ground at a particular base or complex, for example in this instance the feature would select and display all frequencies normally used on the ground and in initial flight, in sequence, at a particular airport. This enables the crew to use these frequencies in order, without manual reference to publications and manual tuning of these frequencies, after they are presented on the screen. To activate this feature the operator operates the start control 20, by pushing a button for instance, which in this embodiment presents the correct sequential ground use frequencies for that particular airport. These ATC frequencies typically include and are typically used in the following order; air terminal information service (ATIS), clearance delivery (CLNC.), ground control (GND.), control tower (TWR.), and in initial flight, departure control (DEP.), and possibly the vehicle's first ATC center frequency (CTR.). Operation of the start control 38 on the ground allows the present position to be resolved by installed equipment or systems to be compared to the airport information database and presented on FPD 42 as a sequential list of the above frequencies. Cursor and select functions to utilize these frequencies are as previously described.

The GUARD or emergency frequency select feature in the embodiment shown in FIG. 6 allow the crew to select, with the push of one button for instance, the emergency feature associated with the radio type (VHF or UHF or other) that the invention is applied to. Upon activation of this Guard select control 20, that emergency frequency is automatically inserted into the current "C" frequency line, immediately becoming tuned upon said activation. All other appropriate frequencies ("C" and "L") shift up, with "C" moving to the "L" position and "L" moving into the $1^{st}$ memory position just off the top of the FPD display screen 42.

All of the components, techniques, processes, procedures, data and other information necessary to accomplish, produce and implement the present invention can be accomplished by means known to those skilled in the art.

It will be understood that the invention is not limited to the embodiment(s) disclosed, and is capable of numerous rearrangements, modifications, and substitutions without departing from the scope of the invention.

What is claimed is:

1. A radio frequency selecting system operable by an operator within a vehicle that will be traveling through successive zones of space, each having a different radio frequency, said system comprising:

a radio aboard the vehicle;

a navigational system (NAV) for detecting the position of the vehicle;

zone frequency logic (ZFL) associating each zone with the radio frequency for that zone;

next zone logic (NZL);

a CPU connected to receive and programmed to use information from the NAV, the ZFL, and the NZL for associating the vehicle position with the next zone into which the vehicle is expected to travel and the radio frequency for the next zone; and a touch operated frequency selector (TOFS) connected to said CPU and said radio for changing radio frequency to the radio frequency for the next zone.

2. Th e system of claim 1, wherein the next zone logic (NZL) is a travel plan logic (TPL).

3. The system of claim 1, comprising a display and a touch operated control (TOC) for identifying on the display a new frequency to be selected by the touch operated frequency select or (TOFS).

4. The system of claim 3, wherein the display shows a series of frequencies, and said system further comprising a cursor for identifying a new frequency to be selected.

5. The system of claim 1, wherein the vehicle is an aircraft.

6. The system of claim 1, wherein the radio further includes a manual frequency selector (MFS) and a display associated with the MFS, showing the frequency that has been selected by use of the MFS.

7. A radio frequency selecting system operable by an operator within a vehicle that is traveling through successive zones of space, each having a different radio frequency, said system comprising:

a radio aboard the vehicle including a display of successive radio frequencies for successive zones, including the last frequency used in the last zone (LF), the current frequency in use in the current zone (CF), and the next frequency expected to be used in the next zone (NF);

a navigational system (NAV) for detecting the present position of the vehicle at a given point of time;

zone frequency logic associating each zone with the radio frequency for that zone;

next zone logic (NZL) establishing a travel plan for the vehicle by zones;

a CPU connected to receive and programed to use information from the navigation system, the ZFL and the NZL, for associating the current position of the vehicle with the zone it is in, with the radio frequency for that zone, with the next zone in which the vehicle is expected to travel, and with the frequency for the next zone; and a touch operated frequency selector (TOFS) connected to said CPU and said radio for changing radio frequency, said TOFS being so adapted, and said CPU being so programed that substantially upon the vehicle entering a new zone, the operator can by touch display to a new LF, a new CF and a new NF, and tune the radio to the new CF.

8. The system of claim 7, comprising a cursor and a cursor control for selecting a new CF by moving the cursor to a frequency shown by the display.

9. The system of claim 8, wherein the TOFS includes a SELECT button adapted to when touched move the cursored frequency to the CF position on the display and tune the radio to this frequency.

10. The system of claim 9, wherein the TOFS is adapted to shift the other displayed frequencies in position when it moves the cursored frequency to the CF display.

11. The system of claim 7, wherein the vehicle is an aircraft.

12. The system of claim 7, wherein the display of successive radio frequencies for successive zones is controlled by the TOFS and the radio further includes a manual frequency selector (CMFS) and a second display associated with the MFS, showing the frequency that has been selected by use of the MFS.

13. The system of claim 7, wherein the TOFS includes a cursor and a cursor control for moving the cursor to any of the displayed frequencies, and wherein said TOFS further includes a SELECT control operable by touch to move the cursored frequency to the CF position in the display and tune the radio to the new CF.

14. The system of claim 7, comprising a START button, and wherein the CPU is programmed to in a response to a touch of the START button, select and display in the display of successive radio frequencies, the frequencies normally used on the ground and in initial flight, in sequence, at a particular airport.

15. The system of claim 14, comprising a cursor and a cursor control for identifying a new CF amongst the displayed frequencies by moving the cursor to a frequency shown by the display.

16. The system of claim 15, further including a SELECT button adapted to when touched move the cursored frequency to the CF position on the display and also tune the radio to this frequency.

17. A method of tuning a communication radio in a vehicle that in use travels through successive zones of space, each having a dedicated communication radio frequency to be used while the vehicle is in that zone, said method comprising:

using a navigation system (NAV) for determining the position of the vehicle;

providing zone frequency logic (ZFL) that associates each zone with the dedicated communication radio frequency for that zone;

providing a programmed CPU; and tuning the communication radio to the dedicated communication frequency for a new zone substantially upon vehicle movement into the new zone, including by use of the CPU, the NAV position information and the ZFL.

18. The method of claim 17, comprising tuning the communication radio to the dedicated communication frequency for then new zone by use of the CPU, the NAV position information and the ZFL together and autotune logic.

19. The method of claim 17, further comprising providing a display of successive dedicated frequencies for successive zones, providing a cursor and a touch operated cursor control for identifying on the display the dedicated frequency for the next zone, providing a touch operated SELECT control, and touching the SELECT control to tune the communication radio to the cursored frequency.

20. The method of claim 19, wherein the display includes a C line for displaying a current frequency CF, and at least one N line for displaying the next frequency NF in the sequence, and using the cursor control to identify the frequency at the N line of the display as being the frequency for the next zone, and using the SELECT control to move the cursored NF frequency up to the “C” line on the display in addition to tuning the communication radio to such new CF frequency.

* * * * *